(No Model.) 2 Sheets—Sheet 1.

G. F. GERMANSON.
SUCTION ROLL FOR PAPER MACHINES.

No. 439,871. Patented Nov. 4, 1890.

Witnesses
Geo. W. Young.
W. E. Oliphant.

Inventor
Gilbert F. Germanson
By H. G. Underwood
Attorney (No Model.) 2 Sheets—Sheet 2.

G. F. GERMANSON.
SUCTION ROLL FOR PAPER MACHINES.

No. 439,871. Patented Nov. 4, 1890.

Witnesses
Geo. W. Young
N. E. Oliphant

Inventor
Gilbert F. Germanson
By H. G. Underwood
Attorney

UNITED STATES PATENT OFFICE.

GILBERT F. GERMANSON, OF CENTRALIA, WISCONSIN, ASSIGNOR OF ONE-HALF TO GEORGE F. STEELE, OF SAME PLACE.

SUCTION-ROLL FOR PAPER-MACHINES.

SPECIFICATION forming part of Letters Patent No. 439,871, dated November 4, 1890.

Application filed March 26, 1890. Serial No. 345,344. (No model.)

*To all whom it may concern:*

Be it known that I, GILBERT F. GERMANSON, of Centralia, in the county of Wood, and in the State of Wisconsin, have invented certain new and useful Improvements in Suction-Rolls for Paper-Machines; and I do hereby delare that the following is a full, clear, and exact description thereof.

My invention relates to suction-rolls for paper-machines; and it consists in certain peculiarities of construction and combinations of parts, to be hereinafter described with reference to the accompanying drawings and subsequently claimed.

Figure 1:
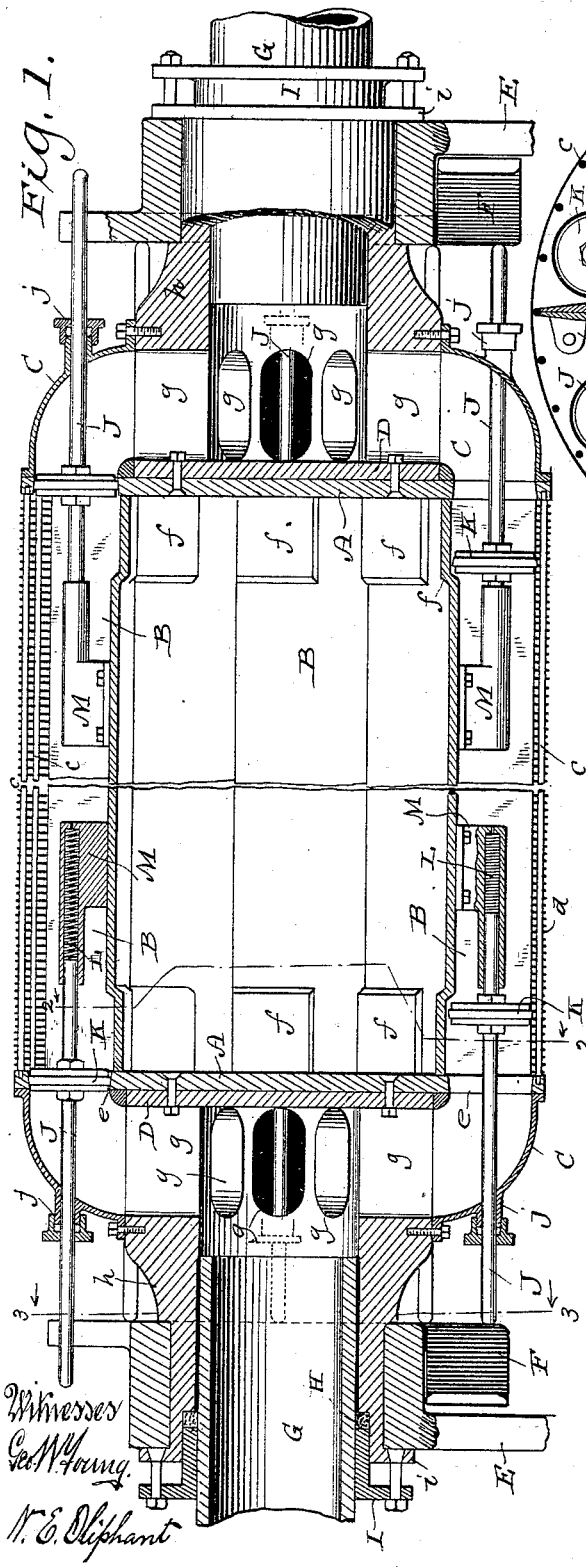
Figure 2:
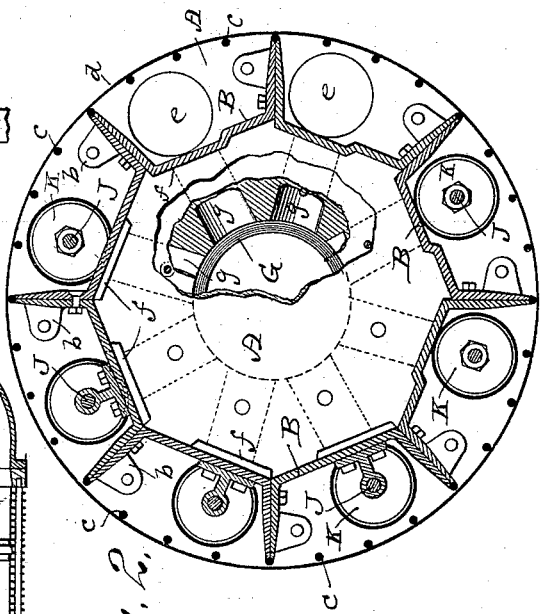
Figure 3:
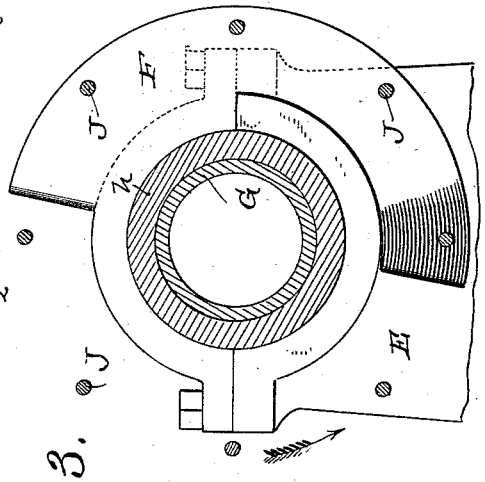
Figure 5:
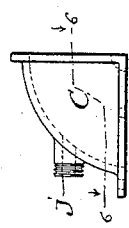
Figure 6:
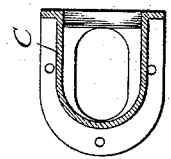
Figure 7:
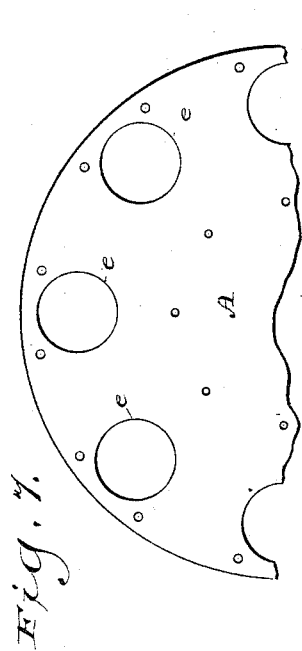
Figure 4:
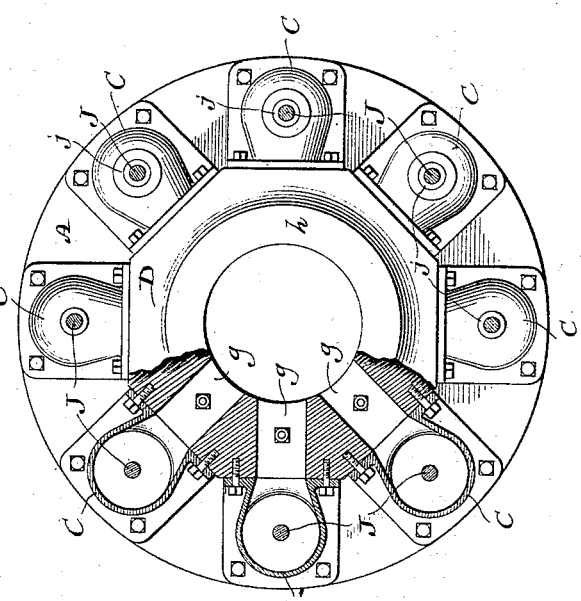

In the drawings, Figure 1 represents a longitudinal section of a suction-roll constructed according to my invention; Fig. 2, an irregular transverse section on line 2 2 of Fig. 1, certain of the parts being broken away, and Fig. 3 a section on line 3 3 of Fig. 1. Fig. 4 is an end view, partly in section, and illustrates one head of the suction-roll connected by a series of elbow-couplings to a hub having radial channels therein; Fig. 5, a side elevation of one of the elbow-couplings; Fig. 6, a horizontal section on line 6 6 of the preceding figure, and Fig. 7 a detail view of a portion of the head shown in Fig. 4.

Referring by letter to the drawings, A A represent two heads, and bolted to these heads are ears $b$ on a series of longitudinal troughs B, the latter in the present instance being eight in number and bolted together to form an octagon shell, as best illustrated by Fig. 2; but the number of said troughs is immaterial, although it is preferable that it be an even one. Outside the shell formed by the connected troughs B are a series of rods $c$, connected at their ends to the heads A A and arranged on a circle, and wound on these rods is a wire $d$, the coils of the latter being any suitable distance apart. While I have shown the wire $d$ wound in the manner described, a screen of woven wire or other suitable foraminous material may be as readily employed.

Each head A is provided with openings $e$, corresponding in number to the troughs B, and the latter are preferably provided with offsets $f$ adjacent to said openings. The openings $e$ in the heads A are connected by elbow-couplings C with radial channels $g$ in hubs D, and the latter are bolted to said heads. Extensions $h$ of the hubs have their bearings in standards E, and these standards are provided with cams F for the purpose hereinafter described.

Inserted in the hub-extensions $h$ are the inner ends of pipes G, that in practice communicate with a suitable suction apparatus, (not shown,) and the bore of each hub is enlarged at the outer end to receive a packing H and flanged ring I, the latter being bolted to a flange $i$ on the end of the hub, to hold said packing in place.

The couplings C are provided with bearings $j$ for rods J, that carry piston-valves K, the latter being arranged to work in the offsetted portions of the troughs B, and said rods have their inner ends opposed by springs L, arranged in boxes M, bolted to said troughs. Rotary motion being imparted to the suction-roll, (in a direction of the arrow shown in Fig. 3,) the rods J are successively brought on and off the stationary cams F, and thus the valves K are forced in away from their seats to open the ports formed by the openings $e$ in the heads A, the couplings C, and radial channels $g$ in the hubs $d$ of the plates D, said cams being preferably of such dimensions that one half of the ports at each end of the roll will be open when the other half are closed.

When a rod J is pushed in to unseat the valve carried thereby, the opposing spring L is compressed in its box M, and when said rod passes off from the opposing cam the expansion of said spring acts to automatically seat said valve, it being understood that the ports at both ends of each trough B are simultaneously opened and closed, and by having the offsets $f$ in the troughs I facilitate the drainage of the latter.

Having thus described my invention, what I claim as new, and desire to secure by Letters Patent, is—

1. A suction-roll having an open-work face, a series of troughs arranged under said face and provided with ports, a suction-pipe communicating with each port, and valves for the ports, in combination with suitable means for automatically actuating each valve at predetermined intervals, substantially as set forth.

2. A suction-roll having an open-work face, a series of troughs arranged under said face and provided with ports, a suction-pipe in communication with each port, a series of sliding rods, and a series of valves carried by the rods in opposition to said ports, in combination with suitable means for actuating said rods, substantially as set forth.

3. A suction-roll having an open-work face, a series of longitudinal troughs arranged under said face and provided at each end with a port, a suction-pipe in communication with each port, and sliding rods carrying valves for the ports, in combination with suitable means for actuating said rods, substantially as set forth.

4. A suction-roll having an open-work face, a series of longitudinal troughs arranged under said face and provided with ports, a suction-pipe in communication with each port, boxes secured within the troughs, springs arranged in the boxes, sliding rods opposed to the springs, and valves carried by the rods to oppose the ports, in combination with suitable means for actuating the rods, substantially as set forth.

5. A suction-roll comprising two heads, each provided with a series of openings arranged at regular intervals, a series of longitudinal troughs secured to each other and the heads in line with said openings, hubs bolted to said heads and provided with radial channels, couplings connecting the head-openings and hub-channels, a suction-pipe connected to the bore of each hub, sliding rods carrying valves in opposition to said head-openings, and an open-work material inclosing the shell formed by the united troughs, in combination with suitable means for actuating the rods, substantially as set forth.

6. A suction-roll having an open-work face, a series of troughs arranged under said face and provided with ports, a suction-pipe communicating with said ports, and a series of sliding rods carrying valves in opposition to the ports, in combination with standards having bearings for the roll and cams arranged on the standards in the path of said rods, substantially as set forth.

In testimony that I claim the foregoing I have hereunto set my hand, at Centralia, in the county of Wood and State of Wisconsin, in the presence of two witnesses.

GILBERT F. GERMANSON.

Witnesses:
T. J. COOPER,
S. A. GOODMAN.